United States Patent
Al-Mehthel et al.

(10) Patent No.: US 10,093,803 B2
(45) Date of Patent: Oct. 9, 2018

(54) SULFUR ASPHALT IN ROOFING, DAMP-PROOFING AND WATER PROOFING

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Hamad I. Al-Abdul Wahhab, Dhahran (SA); Saleh H. Al-Idi, Dhahran (SA); Ibnelwaleed A. Hussein, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/060,076

(22) Filed: Mar. 3, 2016

(65) Prior Publication Data

US 2016/0177096 A1 Jun. 23, 2016

Related U.S. Application Data

(62) Division of application No. 14/069,952, filed on Nov. 1, 2013, now Pat. No. 9,309,441.

(51) Int. Cl.
| | |
|---|---|
| *C08L 95/00* | (2006.01) |
| *C09D 195/00* | (2006.01) |
| *E04D 7/00* | (2006.01) |
| *B32B 11/00* | (2006.01) |
| *C08K 3/06* | (2006.01) |
| *C08L 23/08* | (2006.01) |
| *E04B 1/66* | (2006.01) |

(52) U.S. Cl.
CPC .............. *C08L 95/00* (2013.01); *B32B 11/00* (2013.01); *C08K 3/06* (2013.01); *C08L 23/0853* (2013.01); *C09D 195/00* (2013.01); *E04D 7/00* (2013.01); *C08L 2555/20* (2013.01); *C08L 2555/50* (2013.01); *C08L 2555/52* (2013.01); *C08L 2555/54* (2013.01); *C08L 2555/86* (2013.01); *E04B 1/66* (2013.01)

(58) Field of Classification Search
CPC ...... C08L 95/00; C08L 23/00; C08L 23/0853; C08L 2555/20; C08L 2555/50; C08L 2555/52; C08L 2555/54; C08L 2555/86; C08K 3/00; C08K 3/06; C04B 26/26; C09D 195/00; C10C 3/00; D06N 5/00; E04B 1/66; E04D 7/00; B32B 11/00
See application file for complete search history.

(56) References Cited

U.S. PATENT DOCUMENTS

| | | | |
|---|---|---|---|
| 4,079,158 A * | 3/1978 | Kennepohl | D06N 5/00 427/442 |
| 4,135,022 A | 1/1979 | Kennepohl et al. | |
| 4,145,322 A | 3/1979 | Maldonado et al. | |
| 4,412,019 A | 10/1983 | Kraus | |
| 5,219,901 A | 6/1993 | Burke et al. | |
| 5,371,121 A | 12/1994 | Bellomy et al. | |
| 5,391,417 A | 2/1995 | Pike | |
| 5,449,401 A | 9/1995 | Zuberer | |
| 5,573,586 A | 11/1996 | Yap et al. | |
| 5,672,642 A | 9/1997 | Gros | |
| 5,928,418 A | 7/1999 | Tamaki et al. | |
| 6,011,094 A | 1/2000 | Planche et al. | |
| 6,024,788 A | 2/2000 | Tomioka et al. | |
| 6,087,420 A | 7/2000 | Planche et al. | |
| 6,133,351 A * | 10/2000 | Hayner | C08K 3/06 524/59 |
| 6,440,205 B1 | 8/2002 | Bailey et al. | |
| 6,579,921 B1 | 6/2003 | Liang et al. | |
| 6,695,902 B2 | 2/2004 | Hemmings et al. | |
| 6,706,108 B2 | 3/2004 | Polston | |
| 6,824,600 B2 | 11/2004 | Bailey et al. | |
| 6,863,724 B2 * | 3/2005 | Bailey | C08L 95/00 106/274 |

(Continued)

FOREIGN PATENT DOCUMENTS

| | | |
|---|---|---|
| EP | 0730006 A2 | 9/1996 |
| EP | 1498458 A1 | 1/2005 |

(Continued)

OTHER PUBLICATIONS (2011). Standard Specifications for Transportation Materials and Methods of Sampling and Testing (31st Edition) and AASHTO Provisional Standards, 2011 Edition—M 320-10—Performance-Graded Asphalt Binder. American Association of State Highway and Transportation Officials (AASHTO).*
"Superpave Performance Grading" Oct. 8, 2008. http://www.pavementinteractive.org <http://www.pavementinteractive.org/article/superpave-performance-grading/> Aug. 9, 2016.*
ASTM, "Standard Specification for Asphalt Used in Dampproofing and Waterproofing", ASTM International, 2014, p. 121-122, ASTM International.
International Search Report and Written Opinion for related PCT application PCT/US2014/063597 dated Feb. 17, 2015.

(Continued)

*Primary Examiner* — Jennifer A Smith
*Assistant Examiner* — Alexandra M Moore
(74) *Attorney, Agent, or Firm* — Bracewell LLP; Constance G. Rhebergen; Linda L. Morgan

(57) ABSTRACT

A sulfur-extended plastomer asphalt binder composition useful for water proofing, damp proofing and roofing applications includes elemental sulfur, a plastomer and an asphalt binder. The sulfur-extended plastomer asphalt binder composition can be applied to the surface of a protected member such that the sulfur-extended plastomer asphalt binder composition contacts, adheres to and forms a layer upon the surface of the protected member. The asphalt binder composition is applied at a temperature no greater than 150° C.

9 Claims, No Drawings

(56) References Cited

U.S. PATENT DOCUMENTS

| | | | |
|---|---|---|---|
| 6,916,863 | B2 | 7/2005 | Hemmings et al. |
| 7,226,500 | B2 | 6/2007 | Honma et al. |
| 7,241,818 | B2 | 7/2007 | Hemmings et al. |
| 7,276,114 | B2 | 10/2007 | Polston |
| 7,758,280 | B2 | 7/2010 | Blackmon et al. |
| 7,879,144 | B2 | 2/2011 | Hemmings et al. |
| 8,062,413 | B1 | 11/2011 | Al-Mehthel et al. |
| 8,283,409 | B2 | 10/2012 | Guymon et al. |
| 2003/0037704 | A1* | 2/2003 | Bailey ................ C08L 95/00 106/281.1 |
| 2004/0054038 | A1* | 3/2004 | Andriolo ................ C08K 5/39 524/59 |
| 2006/0293420 | A1 | 12/2006 | Prejean et al. |
| 2008/0200611 | A1* | 8/2008 | Prejean ................ C08L 95/00 525/52 |
| 2009/0076214 | A1 | 3/2009 | Kiss et al. |
| 2010/0256265 | A1* | 10/2010 | Hussein ................ C08L 23/32 524/59 |
| 2011/0041729 | A1 | 2/2011 | Colange et al. |
| 2012/0022182 | A1 | 1/2012 | Ranka |
| 2012/0103232 | A1 | 5/2012 | Al-Mehthel et al. |
| 2012/0184650 | A1 | 7/2012 | Barnat et al. |
| 2012/0252939 | A1* | 10/2012 | Hacker ................ C08L 95/00 524/69 |
| 2013/0210966 | A1* | 8/2013 | Chughtai ................ C08L 95/00 524/71 |

FOREIGN PATENT DOCUMENTS

| | | |
|---|---|---|
| GB | 2038848 A | 7/1980 |
| WO | 03014231 A1 | 2/2003 |
| WO | 2010120482 A1 | 10/2010 |
| WO | 2012061371 A1 | 5/2012 |
| WO | 2012061577 A1 | 5/2012 |
| WO | 2013063343 A1 | 5/2013 |
| WO | 2013119789 A1 | 8/2013 |

OTHER PUBLICATIONS

International Search Report and Written Opinion for related PCT application PCT/US2014/063598 dated Feb. 17, 2015.

International Search Report and Written Opinion for related PCT application PCT/US2014/063599 dated Feb. 17, 2015.

* cited by examiner

SULFUR ASPHALT IN ROOFING, DAMP-PROOFING AND WATER PROOFING

CROSS REFERENCE TO RELATED APPLICATION

This application is a divisional of, and claims priority to and the benefit of U.S. Pat. No. 9,309,441, filed Nov. 1, 2013, titled "Sulfur Asphalt In Roofing, Damp-Proofing And Water Proofing," the full disclosure of which is incorporated by reference in its entirety for all purposes.

BACKGROUND OF THE DISCLOSURE

1. Field of the Disclosure

The field of disclosure relates to asphalt compositions for roofing, damp-proofing and water proofing and their use. More specifically, the field relates to sulfur-extended plastomer asphalt binders.

2. Description of the Related Art

During the manufacturing and processing of materials containing asphalt such as asphalt-coated aggregates and hot asphalt mixes, working temperatures above 300° F. can cause problems for workers and their equipment. At temperatures greater than 300° F., sulfur and sulfur compounds present in asphalt or bitumen mixes, including elemental sulfur and naturally present heteroatom organic compounds, begin to react with other constituents in the asphalt and with the oxygen in the air. One of the main products of these reactions is hydrogen sulfide gas, where free sulfur in hydrocarbon environments dehydrogenates hydrocarbons and forms hydrogen sulfide. Hydrogen sulfide in low quantities is an irritant but in high quantities it is toxic. Heated sulfur that oxidizes in the air forms sulfur dioxide. Sulfur dioxide has a noxious odor and is considered an air pollutant. Working in elevated conditions, including on top of metal roofing, or in confined conditions, including basements and pits, can concentrate and exacerbate the exposure to these unwanted byproducts. It is desirable to find an asphalt composition that is workable at temperatures below 300° F. for worker comfort and safety in addition to not releasing noxious chemicals into the environment.

Sulfur, especially "free" or elemental sulfur, is an abundant and inexpensive material. Elemental sulfur is a byproduct of non-sweet natural gas and petroleum processing. Sources of free sulfur include petroleum refineries and gas sweetening plants. Because of the quantity of sulfur extracted annually from natural gas and petroleum processes, many sulfur producers consider elemental sulfur a "waste" product. Others have attempted to use waste sulfur as an expander or filler for asphalt and bitumen compositions but only have obtained limited success. Therefore, it is also desirable to find commercial uses for elemental sulfur. Incorporating sulfur into commercial products can transform what many consider a waste product into a product that has practical value as an expander of the hydrocarbon resource supply.

SUMMARY OF THE DISCLOSURE

A sulfur-extended plastomer asphalt binder composition that is useful for water proofing, damp proofing and roofing applications includes elemental sulfur, a plastomer and an asphalt binder. The sulfur-extended plastomer asphalt binder composition includes elemental sulfur in a range of from about 10% to about 30%, the plastomer in a range of from about 3% to about 10% and the asphalt binder in a range of from about 60% to about 87%, each by total weight.

A method of waterproofing or damp proofing a protected member having a surface with a sulfur-extended plastomer asphalt binder composition includes a step of combining the plastomer with an asphalt binder maintained at a plastomer mixing temperature such that an intermediate asphalt binder mixture forms. The method also includes the step of combining elemental sulfur with the intermediate asphalt binder maintained at a sulfur mixing temperature such that the sulfur-extended plastomer asphalt binder composition forms. The sulfur-extended plastomer asphalt binder composition comprises elemental sulfur in a range of from about in a range of from about 10% to about 30%, the plastomer in a range of from about 3% to about 10% and the asphalt binder in a range of from about 60% to about 87%, each by total weight. The method also includes the step of applying the sulfur-extended plastomer asphalt binder composition to the surface of the protected member such that the sulfur-extended plastomer asphalt binder composition contacts and forms a layer upon and adheres to the surface of the protected member. The asphalt binder composition is applied at a temperature in a range of from about ambient temperature to no greater than 150° C. The formed layer is operable to prevent water migration through the protected member. The formed layer has a first side in contact with and bonded to the surface of the protected member and a second side that does not contact the surface of the protected member.

Forming sulfur-extended plastomer asphalt binders consumes a significant amount of "waste" sulfur in a low-temperature asphalt binder application. The sulfur-extended plastomer asphalt binder includes elemental sulfur in a range of from about 10% to about 30% of the total weight of the composition. In traditional plastomer/asphalt mixes, this substituted 10% to 30% of material is usually mostly asphalt. The use of the sulfur therefore extends the supply of asphalt with a cheaper and more available material that, surprisingly, imparts desirable viscosity properties. In addition, the compositions comply with ASTM requirements for certain types of rooming, damp proofing, and waterproofing applications.

Maintaining the application temperature of the sulfur-extended plastomer asphalt binder in a range of from about ambient condition to no greater than 150° C. prevents the formation of hydrogen sulfide and sulfur oxides around workers and equipment, especially in isolated and confined environments such as roof tops, basements and generally human-inaccessible locations. The lower temperature of manufacturing and use along with the lower viscosity of the sulfur-extended plastomer asphalt binders results in significant energy savings for users.

BRIEF DESCRIPTION OF THE DRAWINGS

No figures.

DETAILED DESCRIPTION OF THE DISCLOSURE

The Specification, which includes the Summary of Disclosure, Brief Description of the Drawings and the Detailed Description of the Disclosure, and the appended Claims refer to particular features (including process or method steps) of the disclosure. Those of skill in the art understand that the disclosure includes all possible combinations and uses of particular features described in the Specification.

Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the embodiments of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure.

Sulfur-Extended Plastomer Asphalt Binder

The sulfur-extended plastomer asphalt binder is made by combining the asphalt binder, elemental sulfur and the plastomer. The sulfur-extended plastomer asphalt binder is a combination of elemental sulfur in a range of from about in a range of from about 10% to about 30%, the plastomer in a range of from about 3% to about 10% and the asphalt binder in a range of from about 60% to about 87%, each by total weight of the sulfur-extended plastomer asphalt binder composition.

An embodiment of the sulfur-extended plastomer asphalt binder composition consists essentially of elemental sulfur, plastomer and asphalt binder. An embodiment of the composition consists essentially of about 20% elemental sulfur, about 5% the plastomer and about 75% the asphalt binder, each by total weight of the sulfur-extended plastomer asphalt binder composition. An embodiment of the composition consists essentially of about 30% elemental sulfur, about 5% the plastomer and about 65% the asphalt binder, each by total weight of the sulfur-extended plastomer asphalt binder composition.

Asphalt Binder

Bitumen and asphalt that are useful as the asphalt binder can originate from petroleum distillation (for example, vacuum tails); coal, tar sands or oil shale processing; or from naturally occurring sources (for example, Trinidad Lakes). The base asphalt material can be a singular material or a blend of several base asphalts.

Asphalt and bitumen is a colloidal dispersion of asphaltenes in a maltenes phase. Asphaltenes include clusters of large polycyclic aromatic molecules. The structure of asphaltenes may include, in no particular order or regularity, cyclo-alkanes, cyclo-alkenes, and alkane and alkene chains extending from polycyclic molecules for up to 30 carbons (C30) in length. Asphaltenes can also have functional moieties that are capable of reacting with other materials. Functional moieties include alcohols, carboxylic acids, ketones, phenols, amines, amides, sulfides, sulfoxides, sulfones, sulfonic acids, and porphyrin rings chelated with vanadium, nickel, and iron. Asphaltenes also have heterorganic aromatic rings part of their overall polycyclic structure, including benzothiophene, pyrrole and pyridine rings.

The maltenes phase, which is more mobile than the asphaltene phase, includes asphaltene resins, polar and non-polar aromatics, cyclic saturated hydrocarbons (for example, naphthenes), and both straight and long-chain saturated hydrocarbons. Although not intending to be bound by theory, it is believed that polar aromatics in the maltene phase tend to be the dispersing agent for the asphaltenes, interacting with polar functional groups that can exist on asphaltenes. Maltenes can be partially extracted from the dispersion using an n-alkane-based solvent; asphaltenes cannot.

All asphalt and bitumen are suitable as the asphalt binder. Asphaltene concentration varies in amount and functionality depending on the source of the bitumen. The asphaltene content of the asphalt is typically in the range of from about 0.01% by weight to about 30% by weight of the material. An embodiment of the sulfur-extended plastomer asphalt binder composition includes a "Performance Graded" binder based upon the properties listed in the Performance Grade table ("Table 1") of the AASHTO Performance Graded Asphalt Binder Specification M 320 as the asphalt binder. An embodiment of the asphalt binder composition includes where the asphalt binder comprises a PG 64-10 asphalt binder. An embodiment of the asphalt binder composition includes where the asphalt binder consists essentially of a neat PG 64-10 asphalt binder.

Elemental Sulfur

The elemental or "free" sulfur includes not only singular sulfur atoms but also sulfur in complexes and covalently bonded to other sulfur atoms, including α-sulfur (ortho-rhombic sulfur), β-sulfur (monoclinic sulfur) and "catena" sulfur. Chains or rings of sulfur atoms can range from a few sulfur atoms to hundreds of covalently linked sulfur atoms. All allotropes of elemental sulfur are suitable for use in the sulfur-extended composition. Sulfur covalently bonded with non-sulfur atoms, such as carbon, hydrogen or other atomic species, including heterorganic compounds, is not considered "free" or elemental sulfur. Because of the wide variety of allotropes, elemental sulfur is found in many different solid and liquid forms and can change between forms based upon modifications to its environment, including heating and pressure. Typically, however, it is handled in either a pellet or powdered solid form or a molten liquid form.

The source of elemental sulfur can be naturally occurring (for example, mined) or a resultant from natural gas or petroleum treatment processes. For example, a well-known and understood natural gas sweetening process converts hydrogen sulfide into elemental sulfur in a Claus unit.

Plastomer

Plastomers occupy a position between traditional polyolefins and elastomers. Plastomers are a class of polymers that when a load is applied it will yield and stretch (not brittle fracture like a traditional polyolefin such as atactic polypropylene) and will remain in its elongated position when the load is released (unlike an elastomer). Plastomers typically also add the property of high-temperature stiffness similar to a traditional polyolefin, whereas elastomers will begin to flow at lower temperatures. Plastomers can mitigate the potential of permanent deformation and loss of integrity through long-term high temperature exposure, such as what a composition may encounter on roof tops and near appliances that radiate heat. Plastomers are thermoplastic in nature, and therefore will deform in a plastic or viscous manner at melt temperatures of the plastomer and becomes hard and stiff at temperatures below melt.

Examples of useful plastomers include long-chain branched polyolefins, including low-density polyethylenes (LDPE); highly-branched polyolefins, including linear low-density polyethylenes (LLDPE), ethylene/α-olefin(s) copolymers/terpolymers/tetrapolymers, and propylene/α-olefin copolymers/terpolymers/tetrapolymers, where the α-olefin(s) include one or more C3 to C20 olefins, including propylene, butene, hexene, and octane, and the ethylene/propylene comprises at least 50% by weight of the copolymers/terpolymers/tetrapolymers; ethylene butyl acrylates (EBA); and ethylene vinyl acetate (EVA). An embodiment of the sulfur-extended plastomer asphalt binder composition includes where the plastomer is an ethylene vinyl acetate (EVA) polymer. An embodiment of the sulfur-extended plastomer asphalt binder composition includes where the plastomer consists essentially of an ethylene vinyl acetate (EVA) polymer.

Examples of useful EVA plastomers for the sulfur-extended plastomer asphalt binder include the EVA polymers and the homogeneous sulfur-modified polymers (HSMP) as described in PCT Published Application No. 2010/120482 (Hussein, et al.), titled "Sulfur Extended Polymer of use in Asphalt Binder and Road Maintenance". An embodiment of the sulfur-extended plastomer asphalt binder composition includes where the plastomer is a homogeneous sulfur-modified polymer (HSMP). An embodiment of the sulfur-extended plastomer asphalt binder composition includes where the plastomer consists essentially of a homogeneous sulfur-modified polymer.

Forming the Sulfur-Extended Plastomer Asphalt Binder

Addition and blending of components of the sulfur-extended plastomer asphalt binder can occur in any order. A non-limiting example includes adding components individually to a pre-heated and stirred asphalt binder material. Addition of the other components to form the sulfur-extended plastomer asphalt binder can occur sequentially or simultaneously.

Blending occurs in a vessel or apparatus appropriate to combine all of the sulfur-extended plastomer asphalt binder components together. Suitable vessels and apparatuses include metal cans with hand blenders, reactors, buckets, mixing bowls, tanks and low- or high-shear mixing processors. The blending apparatus is operable to both maintain the base asphalt, the intermediate composition and the formed sulfur-extended plastomer asphalt binder at a steady temperature greater than ambient conditions as well as mix the components until obtaining uniformity. Maintaining an elevated and steady temperature ensures that upon addition of sulfur to the composition or formation of the sulfur-extended plastomer asphalt binder limits the likelihood of hydrogen sulfide and sulfur dioxide gas formation, which can be harmful to those individuals performing the blending operation. The blending apparatus is operable to induce circulation in the molten asphalt binder and maintains any intermediate blends in a molten form to ensure the thorough incorporation of asphalt binder components.

A process of forming an embodiment of the sulfur-extended plastomer asphalt binder composition includes introducing into the suitable blending apparatus the asphalt binder used as the base material and then heating the asphalt binder to a plastomer mixing temperature. The plastomer mixing temperature is greater than 150° C. and is usually maintained where the base asphalt becomes molten and fluidic, but not much greater than that. In some cases, the base asphalt is heated to a plastomer mixing temperature of about 180° C. The plastomer is introduced to the asphalt binder and mixed at the plastomer mixing temperature until thoroughly incorporated, forming an intermediate asphalt binder mixture. The plastomer mixing temperature is relatively low compared to typical hot mix asphalt applications. Heat is applied for as long as necessary to blend the plastomer and the asphalt binder together. The risk of forming hydrogen sulfide and sulfur dioxide is low since the base asphalt does not have significant quantities of free sulfur.

Upon thorough incorporation of the plastomer, the temperature of the intermediate asphalt binder mixture cools to a sulfur mixing temperature. The sulfur mixing temperature is in a range of from about the melting point of elemental sulfur to no greater than higher of the flash point of the sulfur-extended plastomer asphalt binder or about 150° C., depending on the content of elemental sulfur. Depending on the molecular configuration of the free sulfur, the melting point of sulfur varies between about 120° C. and about 140° C. Upon reaching the sulfur mixing temperature, elemental sulfur is introduced and blended for an adequate period into the intermediate asphalt binder mixture until thoroughly incorporated. The sulfur-extended plastomer asphalt binder forms upon incorporation of the sulfur.

The sulfur-extended plastomer asphalt binder is compositionally stable. The sulfur-extended plastomer asphalt binder can be maintained at a temperature greater than ambient but no greater than 150° C. for extended periods for both exterior and interior applications.

Use of the Sulfur-Extended Plastomer Asphalt Binder

In the method of waterproofing or damp proofing, an embodiment of the sulfur-extended plastomer asphalt binder composition is applied to a surface of a protected member to form a water proof or damp proof layer. The formed layer has a first side in contact with and adhered to the surface of the protected member and a second side that is not in contact with the surface of the protected member. The layer adheres to the surface of the protected member and prevents water migration through the protected member. The surface is preferably clean; however, this is not necessary. The sulfur-extended plastomer asphalt binder is particularly suited for applying to roof tops and roofing materials already in place.

Sulfur-extended plastomer asphalt binder is useful as a primer for other coatings; roofing; damp-proofing and waterproofing, including adhering roofing sheets to roofs or waterproofing coverings for roofing fabrics; and spray coating for pipes and other industrial protection schemes, including steel and iron. In an embodiment of the method, a second material is introduced to the second side of the layer such that the layer adheres to the second material. The temperature of the layer is in a range of from about ambient temperature to no greater than 140° C. The sulfur-extended plastomer asphalt binder is applied to walls, roofs and other surfaces using asphalt binder spreading and spraying equipment known to one of ordinary skill in the art.

The bonding adhesion of the sulfur-extended plastomer asphalt binder to surfaces, especially metal surfaces, over traditional neat asphalt allows it not only to adhere to surfaces but also to materials applied to it while the composition is at a higher-than-ambient temperature, including roofing tiles, crushed stone and aggregate, tar and waxed papers, fabrics and other materials that support waterproofing, damp proofing and roofing construction activities.

EXAMPLE

Examples of specific embodiments facilitate a better understanding of using the sulfur-extended plastomer asphalt binder composition. In no way should the Examples limit or define the scope of the disclosure.

The asphalt binder for all of the example compositions is a neat Performance Grade asphalt PG 64-10. The plastomer used for all of the example compositions where it is included is HSMP150 made using the procedures as described in PCT Published Application No. WO 2010/120482 (Hussein, et al.) and has the properties as given in, at least, Tables 3 and 4 and paragraphs [0057-0066] of the specification of Published Application. "HSMP150" is the product of combining as described in the Published Application of 50 wt. % elemental sulfur and 50 wt. % EVA28-150. The EVA copolymer has 28 wt. % vinyl acetate content of the copolymer and a melt flow index of 150 g/10 minutes before forming HSMP150.

The asphalt binder is heated to the mixing temperature of greater than 150° C. When sulfur and a plastomer are both part of the same experimental composition, neat asphalt is mixed with the plastomer at 140° C. with a blender having a high shear blade and a blending speed of 2500 RPM, forming an intermediate composition. The elemental sulfur is introduced to the intermediate composition and blended until obtaining a uniform composition. In compositions where plastomer is not part of the composition, the asphalt binder is heated to a temperature of about 160° C. For all experimental compositions, a blender with a high shear mixing blade combines each component for about 5 minutes to achieve uniformity. Each of the formed experimental compositions (neat asphalt, plastomer-extended asphalt, and sulfur-extended plastomer asphalt binders) are maintained at a temperature in a range of from about 135° C. to about 145° C. for application and experimentation.

Each of the compositions as listed in Table 1 are by total composition weight. For example, "+10% Plastomer" represents a composition that is 10% plastomer and 90% plain or neat asphalt binder, each by total weight of the composition.

Prepared experimental compositions are evaluated for viscosity using ASTM D449 and ASTM D312 physical requirements for asphalt useful for damp proofing, waterproofing and roofing. In addition, the experimental compositions are also analyzed for conformance to ASTM D4402. For penetration, ASTM D5 is followed. For ductility, ASTM D113 is followed. For the softening point temperature, ASTM D36 is followed. For the flash point, ASTM D92 is followed.

The test results are presented in Table 1.

TABLE 1

Various properties of neat asphalt binder, plastomer-extended asphalt binder with 5-10 wt. % plastomer, and several sulfur/plastomer extended asphalt binders with varying amounts of plastomer and sulfur.

| Binder Type | Flash Point (° C.) | Softening Point (° C.) | Ductility (cm) | Penetration @ 25° C. under 100 g load for 5 seconds (tenths of mm) | Viscosity (cp) at 135° C. (20 rpm) |
|---|---|---|---|---|---|
| Plain Asphalt | 338 | 52.3 | 150+ | 67.6 | 571.0 |
| +5 % Plastomer | 200 | 54.1 | 73.0 | 70.0 | 750.0 |
| +10% Plastomer | 200 | 56.7 | 34.5 | 73.9 | 912.5 |
| +20% Sulfur, +5% Plastomer | 140 | 53.5 | 51.5 | 85.5 | 362.5 |
| +30% Sulfur, +5% Plastomer | 150 | 52.9 | 44.8 | 85.2 | 350.0 |

As Table 1 shows, the 5/20/75 plastomer/sulfur/asphalt composition shows a 51.7% reduction in viscosity versus the 5/95 plastomer/asphalt composition and a 36.5% reduction in viscosity versus the neat asphalt. The 5/30/65 plastomer/sulfur/asphalt composition shows a 53.3% reduction in viscosity versus the 5/95 plastomer/asphalt composition and a 38.7% reduction in viscosity versus the neat asphalt. The viscosity improvement over both traditional plastomer/asphalt combinations and the neat asphalt binder allows the plastomer/sulfur/asphalt compositions to be worked with a relative lower energy demand, reduces mixing time, and improves ease of application through traditional asphalt spreading equipment.

Table 1 shows that the 5/20/75 and the 5/30/65 plastomer/sulfur/asphalt compositions have similar penetration values and softening points as the plastomer/asphalt and neat asphalt compositions. The 5/20/75 and the 5/30/65 plastomer/sulfur/asphalt compositions have similar improvement in ductility values over the neat asphalt as the plastomer/asphalt compositions. Having similar penetration values, softening points, and ductility to the plastomer/asphalt compositions permits the plastomer/sulfur/asphalt compositions to be treated similarly in application and maintenance.

What is claimed is:

1. A sulfur-extended plastomer asphalt binder composition useful for water proofing, damp proofing and roofing applications, a final mixed product of the sulfur-extended plastomer asphalt binder composition comprising 30% elemental sulfur, 5% plastomer, and 65% asphalt binder, each by total weight of the sulfur-extended plastomer asphalt binder composition where the elemental sulfur is a free sulfur that is separate from the plastomer before addition of the elemental sulfur to the asphalt binder, and where the plastomer is a homogeneous sulfur-modified polymer.

2. The composition of claim 1 where the asphalt binder is a Performance Grade asphalt per the AASHTO Performance Graded Asphalt Binder Specification M 320, Table 1 (2011).

3. The composition of claim 1 where the asphalt binder comprises a PG 64-10 asphalt.

4. The composition of claim 1, wherein the plastomer has a melting point of less than 150° C.

5. A damp proof layer having a sulfur-extended plastomer asphalt binder composition formed by mixing elemental sulfur, plastomer, and asphalt binder, where the amount of elemental sulfur is at least 20% by total weight of the sulfur-extended plastomer asphalt binder composition, where the sulfur-extended plastomer asphalt binder composition has a first side in contact with and adhered to a surface of a protected member and a second side that does not contact the surface of the protected member; and where the elemental sulfur is a free sulfur that is separate from the plastomer before addition of the elemental sulfur to the asphalt binder, and where the plastomer is a homogeneous sulfur-modified polymer.

6. The composition of claim 5, wherein the plastomer has a melting point of less than 150° C.

7. A sulfur-extended plastomer asphalt binder composition useful for water proofing, damp proofing and roofing applications, a final mixed product of the sulfur-extended plastomer asphalt binder composition comprising more than 20% elemental sulfur, about 5% plastomer, and 65%-75% asphalt binder, each by total weight of the sulfur-extended plastomer asphalt binder composition, wherein the elemental sulfur includes free sulfur that is separate from the plastomer before addition of the elemental sulfur to the asphalt binder, and where the plastomer is a homogeneous sulfur-modified polymer.

8. The composition of claim 5, further comprising a second material adhered to the second side of the composition.

9. The composition of claim 8, wherein the second material is selected from the group consisting of roofing tiles, crushed stones, stone aggregates, tar papers, waxed papers, non-flammable fabrics and combinations thereof.

* * * * *